United States Patent
Martz

(10) Patent No.: US 11,225,065 B2
(45) Date of Patent: Jan. 18, 2022

(54) SYSTEM AND METHOD FOR PRODUCING A HEAT-SEALABLE COMPOSITE LIQUID IMPERVIOUS, MOISTURE-ELIMINATING MEMBRANE WITH A METALLIC ANTIMICROBIAL SURFACE TREATMENT

(71) Applicant: Joel Martz, Delray Beach, FL (US)

(72) Inventor: Joel Martz, Delray Beach, FL (US)

(*) Notice: Subject to any disclaimer, the term of this patent is extended or adjusted under 35 U.S.C. 154(b) by 0 days.

(21) Appl. No.: 17/081,998

(22) Filed: Oct. 27, 2020

(65) Prior Publication Data

US 2021/0268787 A1 Sep. 2, 2021

Related U.S. Application Data

(60) Provisional application No. 62/892,349, filed on Aug. 27, 2019.

(51) Int. Cl.
*B32B 37/15* (2006.01)
*B32B 7/12* (2006.01)
(Continued)

(52) U.S. Cl.
CPC ............ *B32B 37/153* (2013.01); *B32B 5/028* (2013.01); *B32B 7/12* (2013.01); *B32B 15/08* (2013.01);
(Continued)

(58) Field of Classification Search
CPC ......... B32B 37/153; B32B 5/028; B32B 7/12; B32B 15/08; B32B 15/14; B32B 15/20; B32B 27/12; B32B 37/06; B32B 27/36; B32B 37/12; B32B 37/24; B32B 38/0008; B32B 2037/243; B32B 2255/02; B32B 2255/10; B32B 2255/205; B32B 2255/26; B32B 2255/28; B32B 2262/02; B32B 2264/0214; B32B 2264/105;
(Continued)

(56) References Cited

U.S. PATENT DOCUMENTS 3,949,111 A 4/1976 Pelletier
4,846,164 A 7/1989 Martz
(Continued)

FOREIGN PATENT DOCUMENTS

WO WO2000013892 A1 3/2000

*Primary Examiner* — Vishal I Patel

(57) ABSTRACT

A system and method for producing a heat-sealable composite liquid impervious, moisture-eliminating membrane with a metallic antimicrobial surface treatment including a compatibilized thermoplastic laminate structure, an integral inductive-welding element, and a metallic antimicrobial surface treatment. The method is provided with at least one scrim, a film exudate, a quantity of primary adhesive, at least one susceptor, and a quantity of flocking material, wherein the scrim, film exudate, and flocking material are composed of a compatibilized thermoplastic compound. The method is further provided with an optional metallic slurry, defining a thermoplastic-particulate emulsion configured to coat and embed into a subjected membrane section and fibrous materials when exposed to heat. The method is further expanded to apply to extant installations of similar membrane sections, enabling to post-manufacture surface treatment of a surface with the metallic slurry to confer manifold antimicrobial benefits to said surface.

20 Claims, 13 Drawing Sheets

(51) Int. Cl.
  *B32B 27/12* (2006.01)
  *B32B 37/06* (2006.01)
  *B32B 37/12* (2006.01)
  *B32B 37/24* (2006.01)
  *B32B 38/00* (2006.01)
  *B32B 15/14* (2006.01)
  *B32B 15/08* (2006.01)
  *B32B 15/20* (2006.01)
  *B32B 27/36* (2006.01)
  *B32B 5/02* (2006.01)

(52) U.S. Cl.
  CPC .............. *B32B 15/14* (2013.01); *B32B 15/20* (2013.01); *B32B 27/12* (2013.01); *B32B 27/36* (2013.01); *B32B 37/06* (2013.01); *B32B 37/12* (2013.01); *B32B 37/24* (2013.01); *B32B 38/0008* (2013.01); *B32B 2037/243* (2013.01); *B32B 2255/02* (2013.01); *B32B 2255/10* (2013.01); *B32B 2255/205* (2013.01); *B32B 2255/26* (2013.01); *B32B 2255/28* (2013.01); *B32B 2262/02* (2013.01); *B32B 2264/0214* (2013.01); *B32B 2264/105* (2013.01); *B32B 2264/12* (2013.01); *B32B 2305/38* (2013.01); *B32B 2307/202* (2013.01); *B32B 2307/31* (2013.01); *B32B 2307/7145* (2013.01); *B32B 2307/7265* (2013.01); *B32B 2310/025* (2013.01); *B32B 2310/028* (2013.01); *B32B 2310/0812* (2013.01); *B32B 2311/24* (2013.01); *B32B 2367/00* (2013.01); *B32B 2437/00* (2013.01); *B32B 2471/02* (2013.01)

(58) Field of Classification Search
  CPC ............ B32B 2264/12; B32B 2305/38; B32B 2307/202; B32B 2307/31; B32B 2307/7145; B32B 2310/025; B32B 2310/028; B32B 2310/0812; B32B 2311/24; B32B 2367/00; B32B 2437/00; B32B 2471/02
  See application file for complete search history.

(56) References Cited

U.S. PATENT DOCUMENTS

| | | |
|---|---|---|
| 5,061,258 A | 10/1991 | Martz |
| 5,593,395 A | 1/1997 | Martz |
| 5,656,167 A | 8/1997 | Martz |
| 6,071,834 A | 6/2000 | Martz |
| 6,503,855 B1 | 1/2003 | Menzies et al. |
| 7,803,446 B2 | 9/2010 | Martz |
| 7,851,043 B2 | 12/2010 | Ditter et al. |
| 2004/0214492 A1 | 10/2004 | Martz |
| 2004/0247653 A1 | 12/2004 | Gabbay |
| 2009/0095159 A1 | 4/2009 | Martz |
| 2010/0189976 A1* | 7/2010 | Snyder .................... B32B 27/32 428/215 |
| 2016/0338359 A1 | 11/2016 | Gabbay |
| 2017/0074829 A1* | 3/2017 | Mertins ................... B32B 5/028 |
| 2020/0190820 A1 | 6/2020 | Meersseman et al. |

* cited by examiner

US 11,225,065 B2

SYSTEM AND METHOD FOR PRODUCING A HEAT-SEALABLE COMPOSITE LIQUID IMPERVIOUS, MOISTURE-ELIMINATING MEMBRANE WITH A METALLIC ANTIMICROBIAL SURFACE TREATMENT

The current application claims a priority to the U.S. provisional patent application Ser. No. 62/892,349 filed on Aug. 27, 2019. The U.S. provisional patent application 62/892,349 is revived within the two-month period for unintentional abandonment by Oct. 27, 2020.

FIELD OF THE INVENTION

The present invention relates generally to the field of composite material assembly and laminate manufacture. More specifically, the present invention relates to an operational order and method for the creation of a novel membrane suitable for assembly using conventional heat-sealing processes. Improvements relating to the application of a surface treatment considered particularly effective in neutralizing settled pathogens are also broadly contemplated as an emergent functionality of the proposed composite structure.

BACKGROUND OF THE INVENTION

Referring to the currently-adopted standard for 'Resistance of Materials Used in Protective Clothing to Penetration by Liquids' by the American Society for Testing and Materials (ASTM F903); this standard outlines a 'test method is normally used evaluate the barrier effectiveness against penetration of liquids through materials, seams, closures, or other planar assemblies used in protective clothing and specimens from finished items of protective clothing.' Failure of conventional garments typically stems from the use of a non-uniform porous exterior membrane, wherein the irregular pore diameters of the surface membrane enable the infiltration of a challenge liquid (during testing) or a contaminant substance (during regular use) as the liquid surface tension decreases. This standard is a predecessor to more recently developed standards for permeability of surgical gowns (F1670/F1671), chemical-blocking garments (F903), and acceptable limits for outward moisture transport (E96/E96M), wherein the protective value of a membrane is assessed by controlled exposure to challenge compounds (generally simulating chemical or biological contaminants). Unfortunately for the users of such protective membranes, conventional manufacturing methods are unable to consistently produce reliable, breathable membranes that meet or exceed the pass-conditions for these testing standards. Manufacturing flaws and material failure contribute to failure rates of finished products, including the use of textile-stitching and seam-taping methods typically used in the assembly of garments comprising chemically incompatible materials. The opportunity for failure of these seams must be obvious—the penetration of the barrier with every stitch offers a possible route for liquid penetration should the adhesive tape fail at any point. Barriers may also fail because of inherent compositional deficiencies, such as hydrophilic polyurethane polymers and adhesives. A liquid present at the surface of this type of polymer may undergo chemical adsorption, and the liquid eventually penetrating the barrier as a vapor through an adsorption-diffusion-desorption process during prolonged exposure. The failures of conventional membranes cannot be ignored, particularly in light of the current demand for reliable protective garments and sterilizable surfaces in response to the COVID-19 pandemic.

Therefore, an objective of the present invention is to utilize a compatibilized material composition may provide a means of forming impermeable membranes without the use of conventional failure-prone manufacturing methods. Specific considerations are given to the inclusion of surface-level metallic elements to impart continuous antimicrobial benefits to any finished volume of the proposed material. Further, a process for applying this surface treatment to conventional materials, in conjunction with the novel membrane structure, is disclosed herein. In one specified application, the membrane produced by the proposed process may be employed as a base or underlayment for conventional carpeting (carpets, carpet tiles, etc.). This configuration enables the infusion of chemical decontaminants into the carpet material, retaining the decontaminant compounds against the membrane for a more effective decontamination process. A cost-reduction benefit is further related via the use of a thinner barrier element; a barrier structure, typically in the range of one mil (i.e. one thousandth of one inch) for monolithic embodiments, might be reduced to a fraction of this thickness via the use of a separately-formed supporting structure bonded to the barrier. The cost savings, utilizing Arnitel® PM460 at $3.60-$4.80/lb, would be substantial assuming a ~60% reduction in the requisite material-per-yard of finished product.

DETAILED DESCRIPTION OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
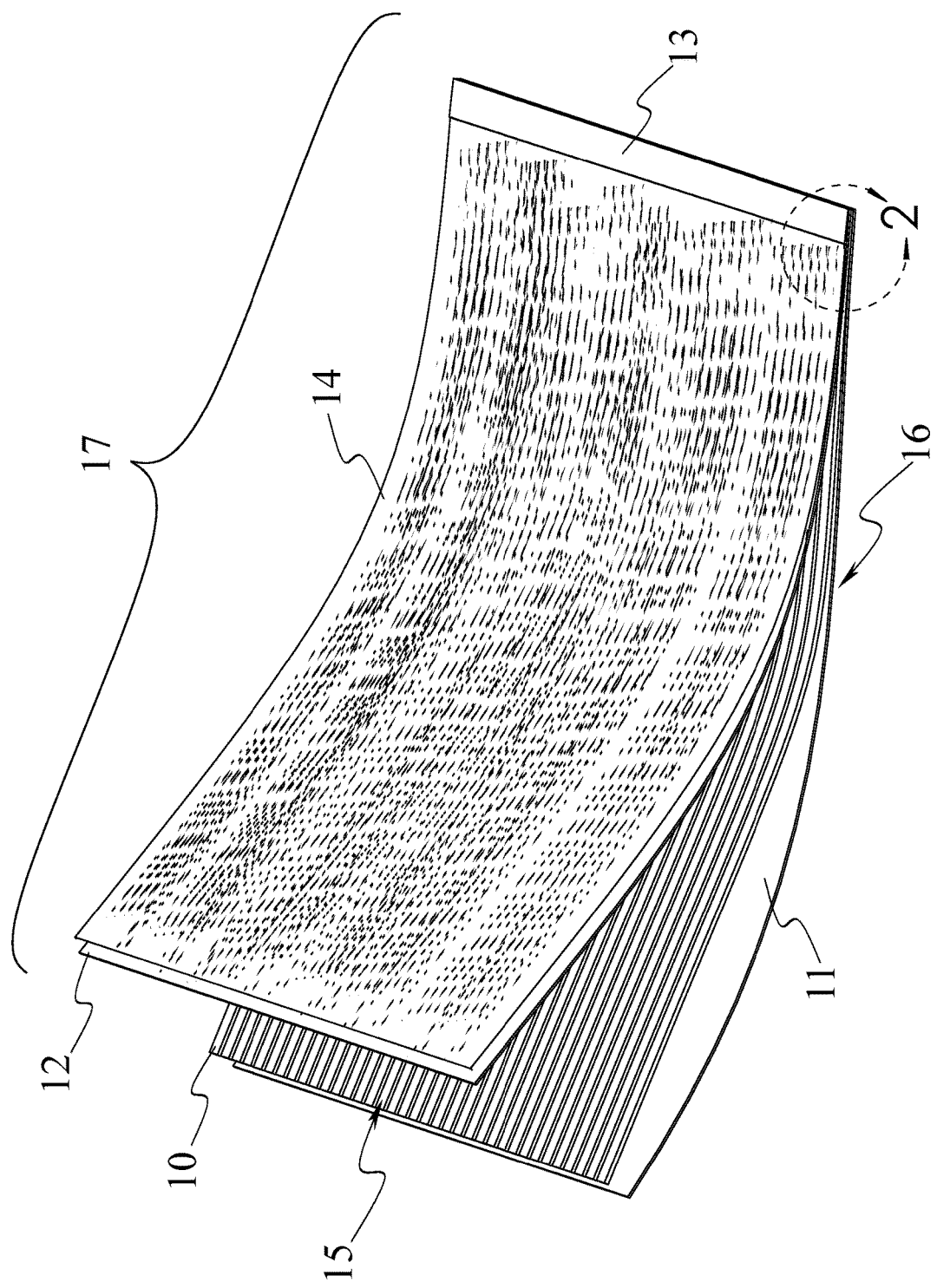
FIG. 1 is an isometric view of an exemplary embodiment of the product of the present invention, wherein the layers of said product are partially delaminated to illustrate structure.
Figure 2:
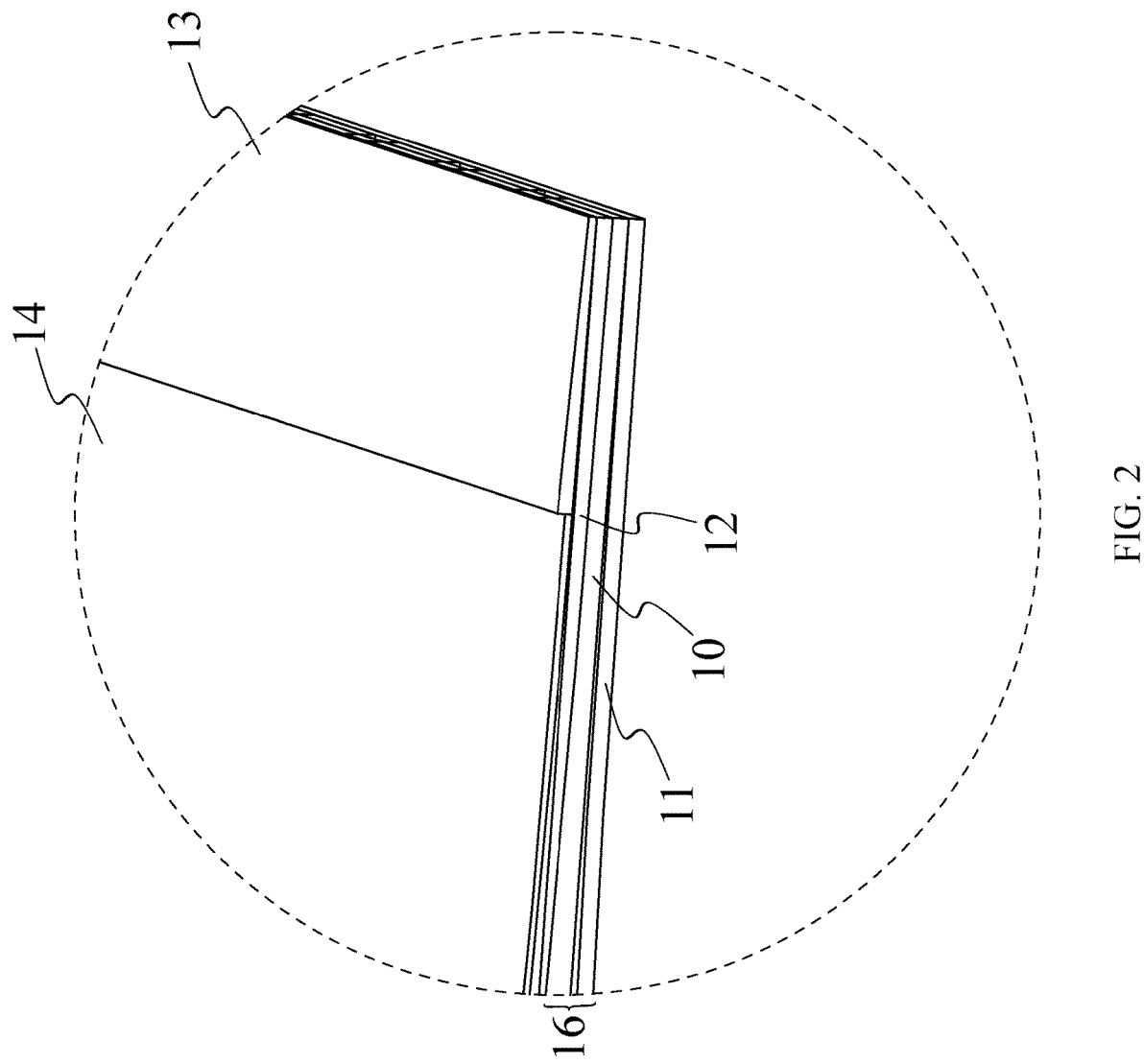
FIG. 2 is a detail view taken about circle 2 in FIG. 1.
Figure 3:
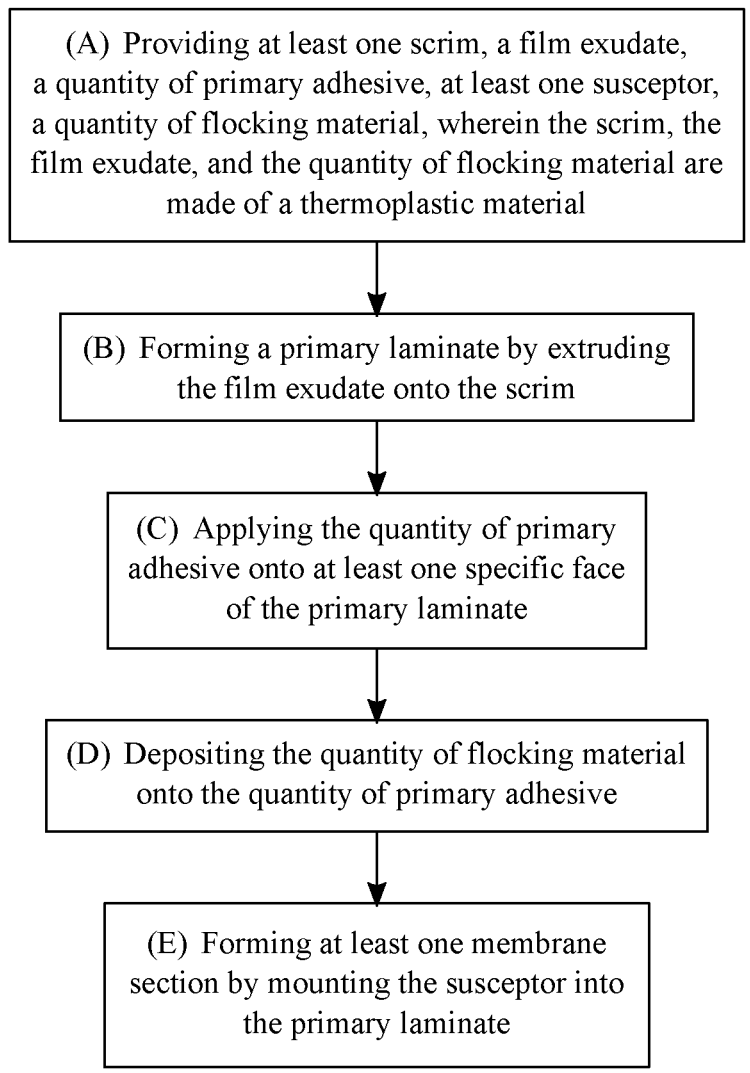
FIG. 3 a flowchart illustrating the overall process of the present invention.

In reference to FIGS. 1 through 3, the present invention is a system and method of assembling a homogenized impermeable membrane. To accomplish this, the system of the present invention utilizes at least one scrim 10, a film exudate 11, a quantity of primary adhesive 12, at least one susceptor 13, and a quantity of flocking material 14; wherein the scrim 10, the film exudate 11, and the quantity of flocking material 14 are made of a thermoplastic material (Step A). The use of a compatibilized material for the constituent components of the membrane is an essential element of the proposed laminate structure. The term compatibilized indicating any material or collection of materials that may be bonded, welded, or otherwise permanently mounted to each other to form an impermeable seam without disrupting the impermeability of the unworked material. The use of thermoplastic compounds specifically enables the use of a thermal sealing process, such as ultrasonic sonotrode-anvil sealing or impulse welding. More generally, it is realized that a laminate composed of similar materials may be effectively fused into a uniform seam in comparison to conventional membranes.

In a preferred embodiment, the scrim 10 constitutes a perforated membrane, mesh, netting, yarn array, or other form of stable tensile member primarily comprises a thermoplastic material. The scrim 10 lends dimensional support to the film exudate 11, defining the finished shape and dimensions of a finished volume of barrier membrane. Apertures, gaps, or other material formed through the scrim 10 expose maximum surface area of the film exudate 11 to enable monodirectional moisture permeation of the barrier, i.e. to allow the membrane to breathe without compromising the moisture barrier qualities. The scrim 10 may be defined as a manufactured element in and of itself; the intersections of any material comprising the scrim 10 being fixed to any subsequent layers by conventional adhesive or welding process. The perforated pattern defined by the scrim 10 may vary across any finished length of said scrim 10, e.g. the density of strands-per-surface area being configured to lend targeted dimensional support to a finished product without substantively increasing the weight or cost of the scrim 10. Assembly of the individual constituent yarns may be performed of a loom or frame prior to introduction into the proposed manufacturing process. In addition, a co-extrusion process may be employed to form an embodiment of the scrim 10 wherein the primary adhesive 12 is integrated directly into a surface of the scrim 10. This co-extrusion process may be supplemented into the overall process as a contemporaneous process to the attachment of the film exudate 11 to the scrim 10. In general, preparation of the scrim 10 may be performed by any known means or methods such that a suitable supporting structure is provided for the film exudate 11.

Accordingly, the method of the present invention follows an overall process in order to manufacture an impermeable membrane efficiently and effectively. The overall process begins with forming a primary laminate 16 by extruding the film exudate 11 onto the scrim 10 (Step B). The film exudate 11 is a flat or blow-molded extrusion of resinous membrane, either as a catalyzed resin or partially melted body of thermoplastic suitable for adhesion to the scrim 10. As previously outlined, the ideal material for this application is a similar chemical composition to the constituent material of the scrim 10, e.g. a polyester-polyester bond. Accordingly, the primary laminate 16 constitutes a self-supporting, compatibilized assembly of the film exudate 11 and the scrim 10 providing improved workability over conventional membrane polymers. Workability, in this context, refers to the compatibility of the primary laminate 16 with single-stage welding processes as previously outlined. This compatibility reduces and eliminates the risk of layer delamination stemming from the use of dislike, incompatible materials forced into a single composite structure. Further, the seam-welding process prescribed herein may cause the separation of such incompatible materials, creating air gaps and other material faults that may compromise the impermeability of a barrier membrane. Additional benefits are conferred in terms of cost per unit-cost, i.e. a reduced material expense per yard of finished material. The thickness of the film exudate 11 may be reduced below that of conventional self-supporting membranes; the scrim 10 providing dimensional support and tensile strength to the primary laminate 16 while the film exudate 11 presents an impermeable barrier layer against exterior contaminants.

The overall process continues by applying the quantity of primary adhesive 12 onto at least one specific face 15 of the primary laminate 16 (Step C). The primary adhesive 12 ideally defines a contact chemical adhesive suitable for application directly to the scrim 10 and the film exudate 11, in combination. In at least one conceivable embodiment, the primary adhesive 12 may comprise a discontinuous melted adhesive, thermoplastic adhesive or by a water-based breathable adhesive that is mutually compatible with the scrim 10 and the film exudate 11. Though this composition may vary in application, the use of a thermoplastic-based adhesive maintains the benefits of a compatibilized scrim 10 and film exudate 11 as previously outlined. In applications wherein a compatible composition is not utilized, the dispersal of the primary adhesive 12 may be limited or otherwise directed away from areas where weldments or other seam-sealing operations may be performed. In the proposed embodiment the specific face 15 refers to one planar face of the primary laminate 16, ideally defined as an upward-facing area drawn between two tensioning members.

This orientation supports the subsequent step of the overall process, which is to deposit the quantity of flocking material 14 onto the quantity of primary adhesive 12 (Step D). The quantity of flocking material 14 as previously outlined, ideally defines a volume of shredded thermoplastic fibers. Step D is ideally employed to provide a softer, more compressible inner surface for the primary laminate 16, directed towards applications wherein the finished membrane comprises a wearable item. In non-garment applications, the fiber-flocking process may still be employed to thicken the finished membrane to provide impact-absorbing qualities, increase the overall tensile strength of the membrane, or for any other purpose aided by the deposition of additional thermoplastic material to the primary laminate 16. The flocking process, i.e. deposition of the quantity of flocking material 14 to the primary laminate 16, is variable dependent on the target qualities of the finished barrier membrane. In the simplest iteration of the overall process, the quantity of flocking material 14 may be deposited from a gravity-fed hopper or other comparable dispenser, defined as a 'drop-flock' process. The flocking process would ideally be performed continuously until the primary adhesive 12 has been fully coated by the quantity of flocking material 14. Any volume of misapplied or non-adhered flocking material 14 will fall away from the primary laminate 16 for collection and recirculation until no exposed primary adhesive 12 remains uncovered.

A single cycle of the overall process concludes by forming at least one membrane section 17 by mounting the susceptor 13 into the primary laminate 16 (Step E). In some embodiments, Step E is not included as a part in the overall process, but Step E is still included as a supplemental or optional part of the overall process. The susceptor 13 defines a conductive metallic element integrated to the primary laminate 16, ideally composed of aluminum, mylar, or a comparable metallic film. The inclusion of the susceptor 13 enables the weldment of the membrane section 17 using inductive current, wherein the susceptor 13 converts electromagnetic energy into heat to melt the constituent materials of the scrim 10, the film exudate 11, and the flocking material 14 into a coalescent, contiguous seam. This induced welding process may be targeted by the selective placement of the susceptor 13 within the membrane section 17, thereby focusing the heat radiating from the susceptor 13 along pre-formed areas designated form seam-formation.

Figure 4:
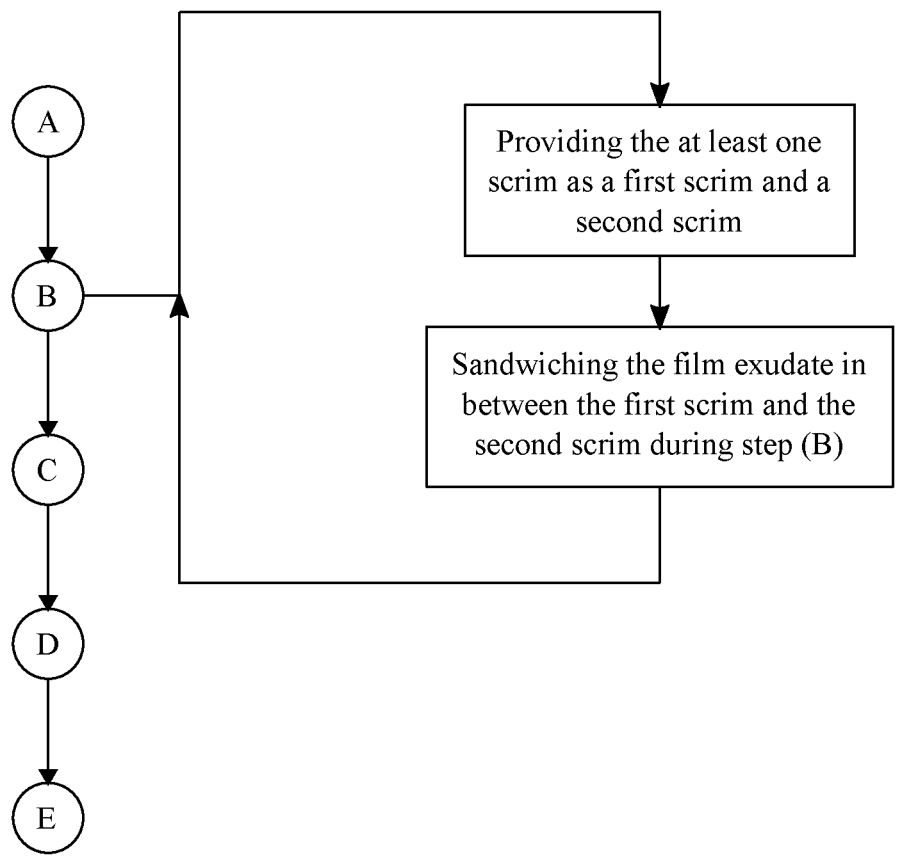
FIG. 4 is a flowchart illustrating a subprocess for increasing the material density and tensile strength of the primary laminate.

Referring to FIG. 4, in at least one alternate embodiment, the at least one scrim 10 is provided as a first scrim and a second scrim, wherein the film exudate 11 is sandwiched in between the first scrim and the second scrim during Step B. The addition of a second perforated support structure further enhances the dimensional stability of the primary laminate 16 as a planar textile, enabling the creating of a semi-rigid primary laminate 16 without dramatic increases to the volume of the film exudate 11. Additionally, the structural uniformity of the primary laminate 16 in this embodiment eliminates any pronounced material vulnerabilities that may emerge during deformation around a radius. Presuming that the first scrim constitutes the innermost layer of the primary laminate 16 and the second scrim defines the outermost layer, the first scrim bears a compressive strain while the second scrim bears a tensile strain, as opposed to the film exudate 11 bearing either strain directly.

Figure 5:
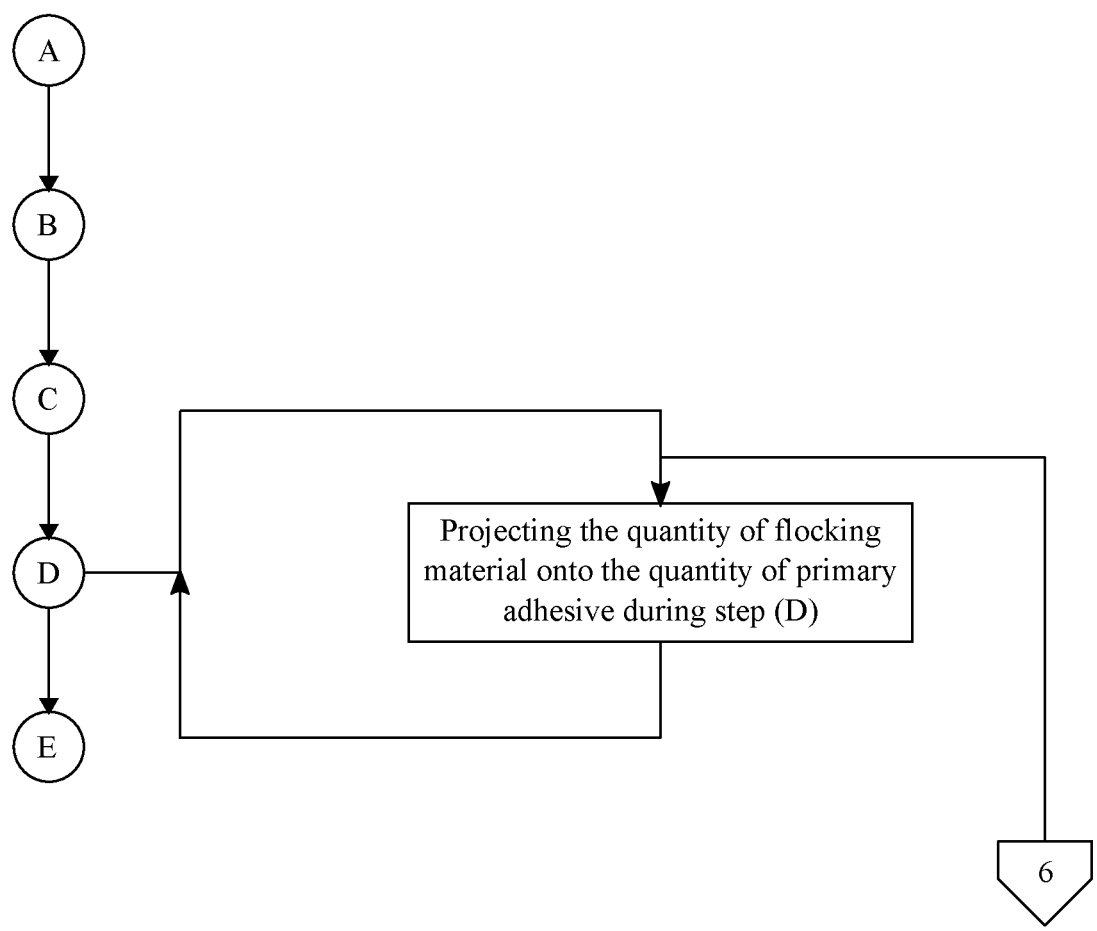
FIG. 5 is a flowchart illustrating an improvement to the flocking process.

In reference to FIG. 5, the flocking process may be enhanced by projecting the quantity of flocking material 14 onto the quantity of primary adhesive 12 during Step D, wherein a projector, blower, agitator, or other accelerator may be introduced between the hopper and the primary laminate 16 to accelerate the recirculation of the quantity of flocking material 14 through an application area. This augmentation to the drop-flock process ideally reduces the time required for all exposed primary adhesive 12 to capture a quantity of flocking material 14. Further, the agitation reduces any wastage stemming from stationary, but non-adhered flocking material 14 being carried out of the application area on the primary laminate 16.

Figure 6:
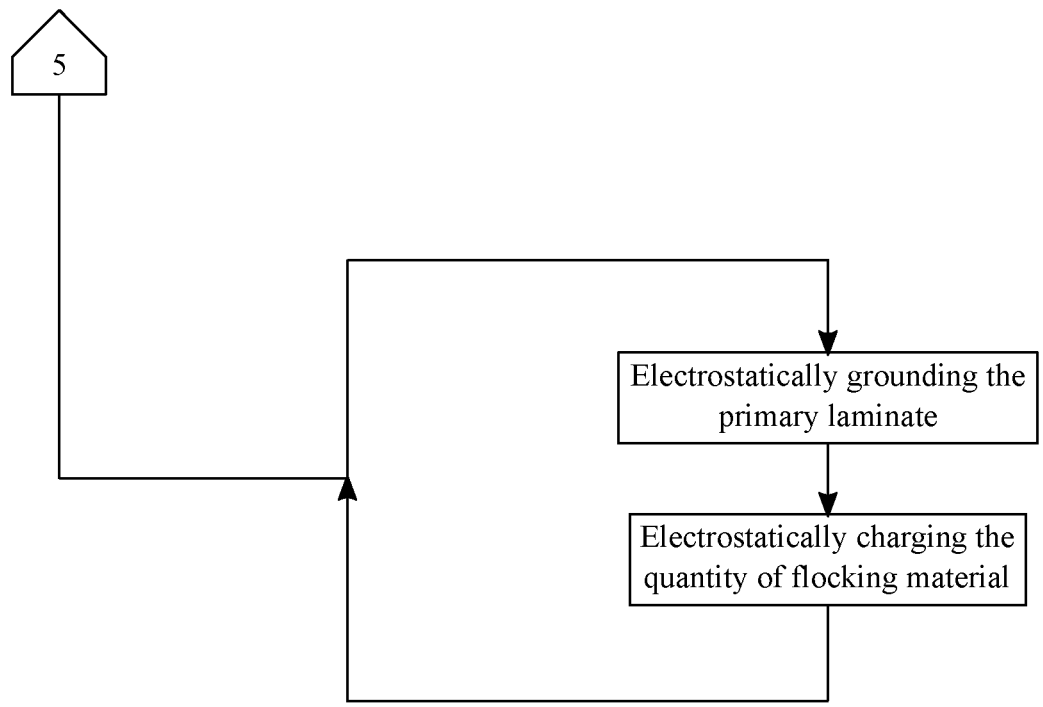
FIG. 6 is a flowchart illustrating a subprocess of the flocking process, wherein an electrostatic application process is applied.

The flocking process may be further improved via the introduction of an electrostatic coating process in conjunction with the flocking projector, as outlined in FIG. 6. This subprocess begins with electrostatically grounding the primary laminate 16, then electrostatically charging the quantity of flocking material 14. It is necessary to insulate the quantity of flocking material 14 from the primary laminate 16 to create a charge differential between the separated components. After the quantity of flocking material 14 acquires a charge, the projector projects the quantity of flocking material 14 towards the primary adhesive 12. As the quantity of flocking material 14 approaches the primary laminate 16, the charged fibers comprising the quantity of flocking material 14 are attracted to the grounded element. This causes the primary adhesive 12 to rapidly collect a uniform layer of flocking material 14, improving both coating time and material efficiency. It is understood that the conductivity of the primary laminate 16, as a function of the electrostatic deposition process, may be supplemented with a separate conductive element for this portion of the proposed manufacturing process.

Figure 7:
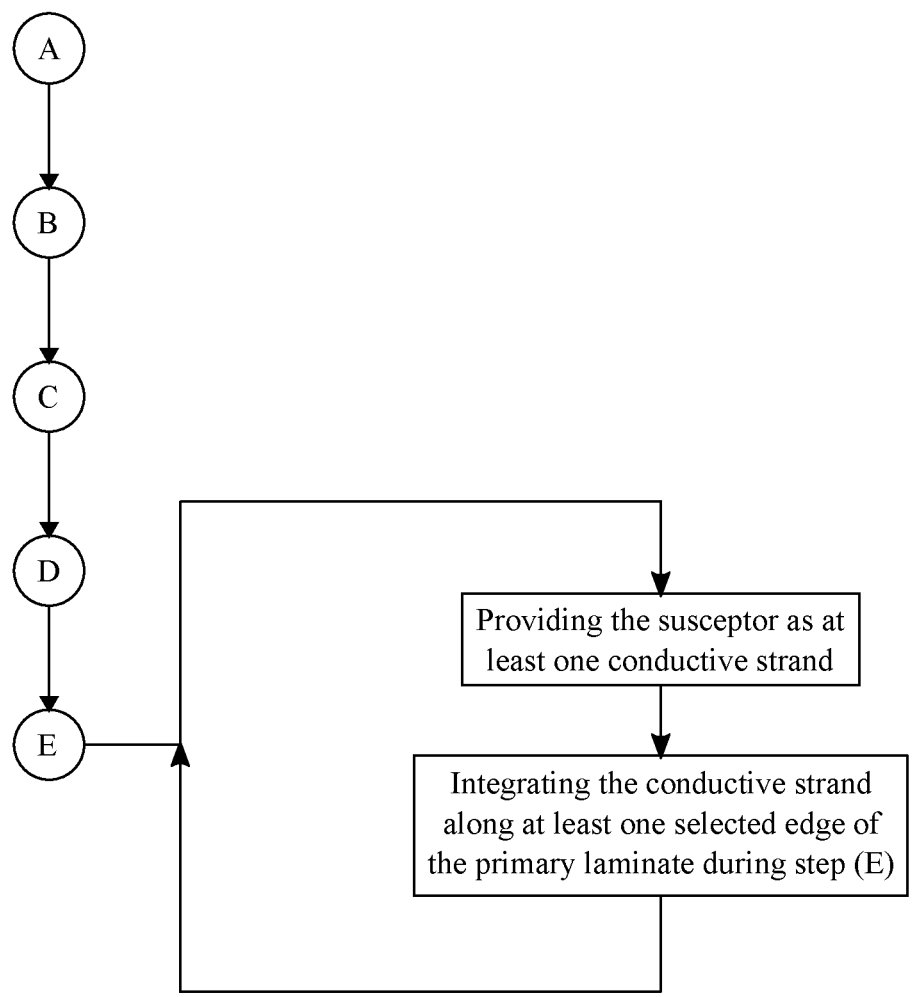
FIG. 7 is a flowchart illustrating a subprocess for integrating the susceptor as a conductive strand.

In one conceivable embodiment outlined in FIG. 7, the susceptor 13 may define at least one conductive strand, with the conductive strand integrated along at least one selected edge of the primary laminate 16 during Step E. The conductive strand may define any conductive metallic body capable of acting as a susceptor 13 in the overall process. The conductive strand is broadly considered across a variety of potential embodiments, unconstrained by in shape or dimensions. Accordingly, the selected edge of the membrane section 17 may constitute a complex edge profile as may be required for the manufacture of garment templates. Further, the conductive strand may constitute a ductile support within the membrane section 17, such that the membrane section 17 may be deformed into various self-supporting shapes defined by the curvature of the selected edge. It is realized that the susceptor 13 may not be immediately required during the proposed process for the assembly of the membrane section 17. However, the omission of this component at this stage is broadly considered outside of the scope of the present invention, as the integration of the susceptor 13 in any embodiment enables later activation of the susceptor 13 as a heating element for seam-welding and decontamination via activated chemical compositions. Considered more broadly, the inclusion of the susceptor is not strictly necessary for non-inductive processes but is still recommended for inclusion based on the capacity for future functionality to be outlined herein.

Figure 8:
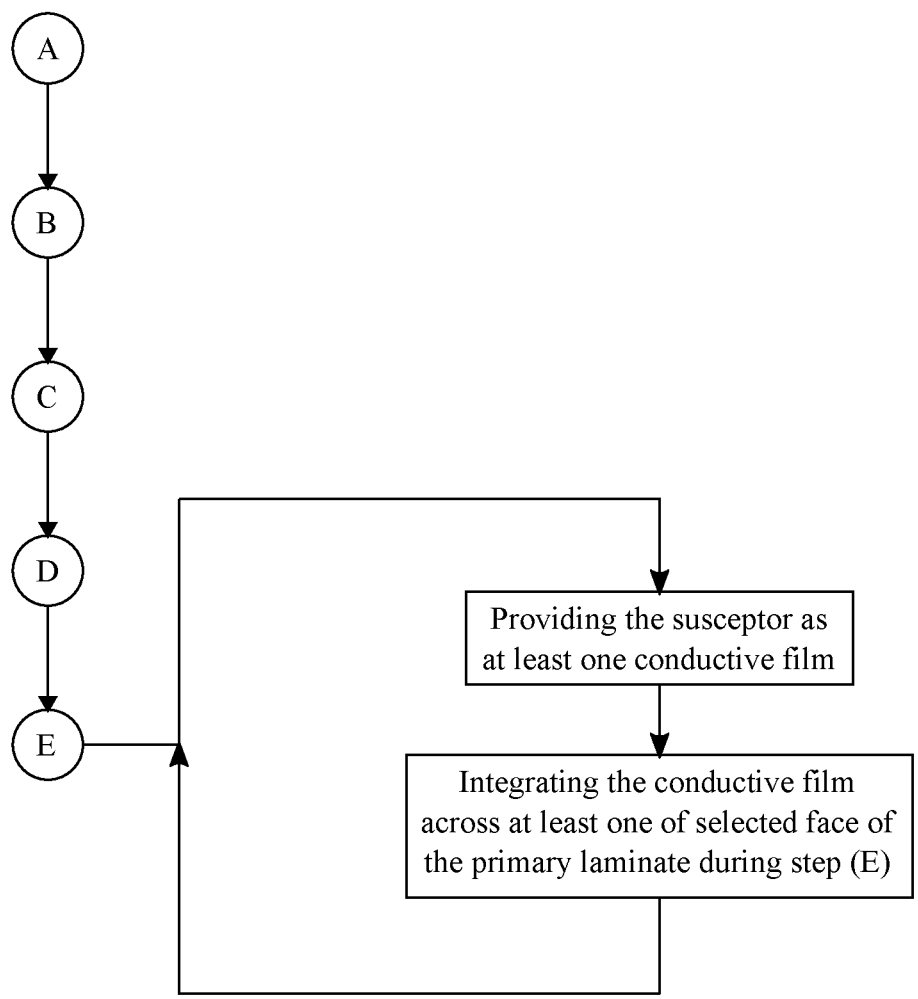
FIG. 8 is a flowchart illustrating a subprocess for integrating the susceptor as a conductive film.
Figure 9:
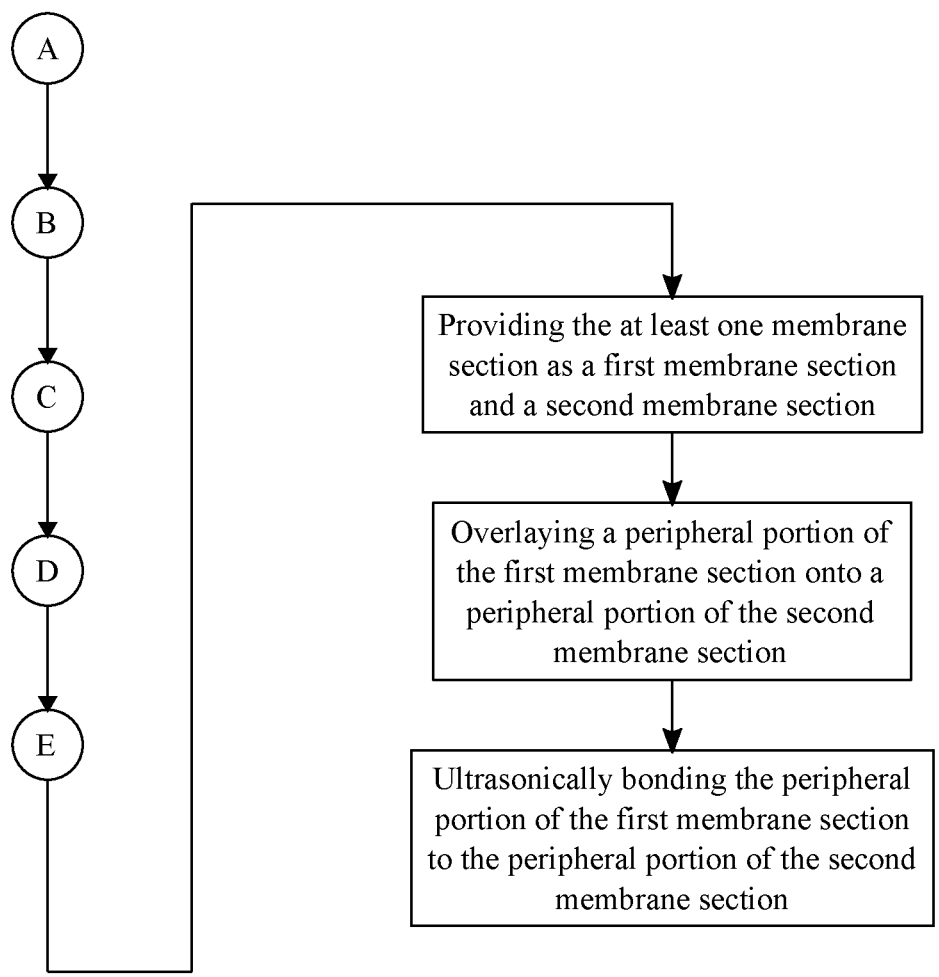
FIG. 9 is a flowchart illustrating a subprocess for bonding a first membrane section and a second membrane section via an ultrasonic welding process.

This minimized embodiment of the conductive strand may be supplanted or supported by an expanded iteration of the susceptor 13 in an alternate subprocess as illustrated in FIG. 8, wherein the susceptor 13 is at least one conductive film integrated across at least one of selected face of the primary laminate 16 during Step E. The insertion of at least one conductive film, as opposed to the conductive strand, enables the treatment of a substantial portion of the membrane section 17 by exposing the conductive film to an inductive current. This may be used to further embed the laminated layers of the membrane section 17 post-assembly by effectively melting-in the disparate layers of thermoplastic material around the conductive film. Further, the capacity to remotely heat the membrane section 17 remotely enables the application of a surface treatment Referring to FIG. 9, to execute a single iteration of the weldment process referenced thus far at least one membrane section 17 is provided as a first membrane section and a second membrane section. A peripheral portion of the first membrane section is overlaid onto a peripheral portion of the second membrane section so that the peripheral portion of the first membrane section can be ultrasonically bonded to the peripheral portion of the second membrane section. The use of the ultrasonic weldment process generally involves the positioning of the first membrane section and the second membrane section between a sonotrode and an anvil; a sound-generating device and a mounting surface onto which the materials to be welded are stacked. The sonotrode delivers high-frequency vibrations into the peripheral portion of the first membrane section, causing the opposing face of the first membrane section to vibrate against the peripheral portion of the second membrane. This vibration results in frictional heating, causing the compatibilized materials comprising the first membrane section and the second membrane section to become welded together between the sonotrode and the anvil. This weldment may also be achieved via conventional conductive welding processes utilizing a similar process.

Figure 10:
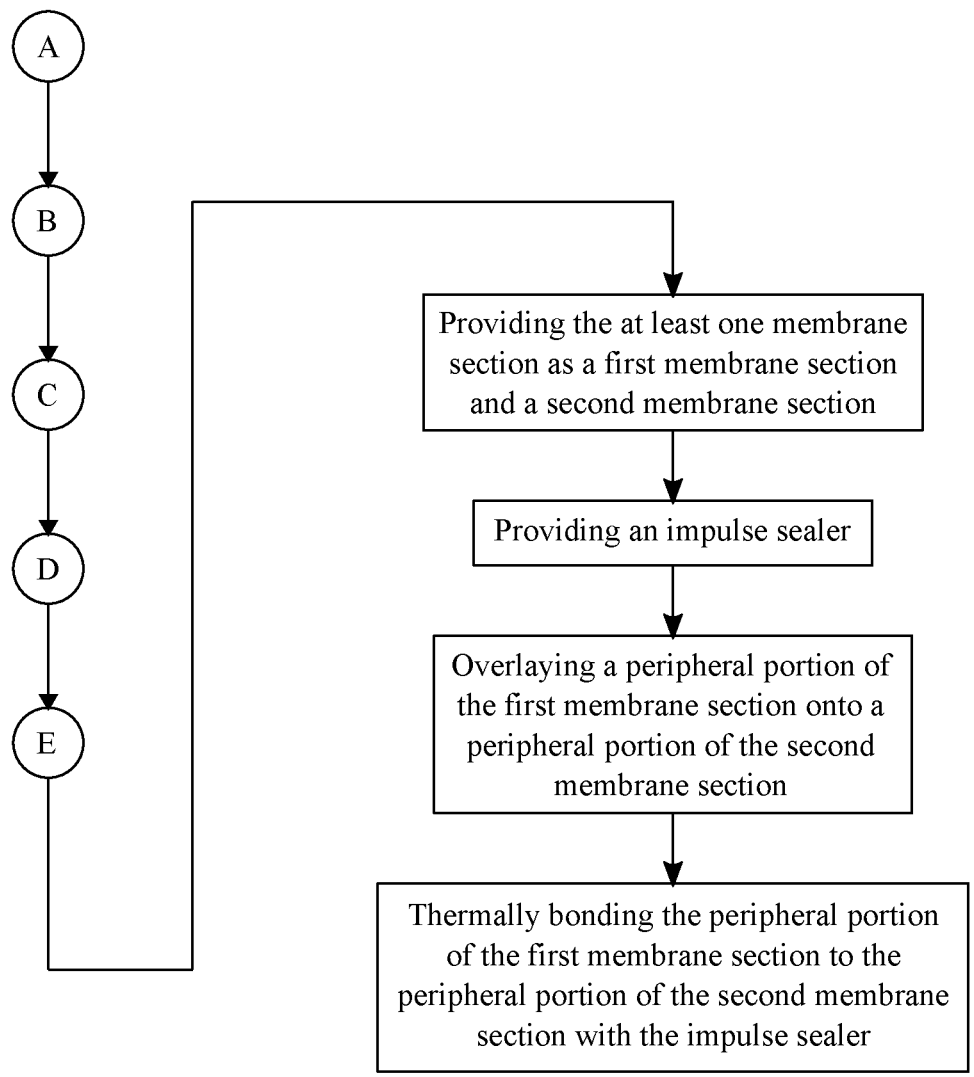
FIG. 10 is a flowchart illustrating a subprocess for bonding a first membrane section and a second membrane section via an impulse sealing process.

In another embodiment of the weldment process outlined in FIG. 10, the at least one membrane section 17 is again a first membrane section and a second membrane section. Distinct from the ultrasonic welding iteration, an impulse sealer is provided for a conductive welding process. The peripheral portion of the first membrane section is again overlaid onto the peripheral portion of the second membrane section so that the peripheral portion of the first membrane section can be thermally bonded to the peripheral portion of the second membrane section with the impulse sealer. The impulse sealer operates via the direct conversion of electrical energy into heat along a jaw structure. The portions of the first membrane section and the second membrane section are rapidly melted along any areas contacting the jaws of the impulse sealer, causing the constituent thermoplastic materials to form into a coalescent seam. In either of these welding processes, the use of a homogenized or compatibilized material structure is essential; the ultrasonic vibrations may cause the formation of voids between dislike materials, or the impulse heat may not effectively melt materials possessing varying phase-change temperatures. These dissimilarities can result in delamination of the peripheral portions of either membrane section 17, limit the penetration of the welded material, or form brittle cold-seams that may fail when bent.

Figure 11:
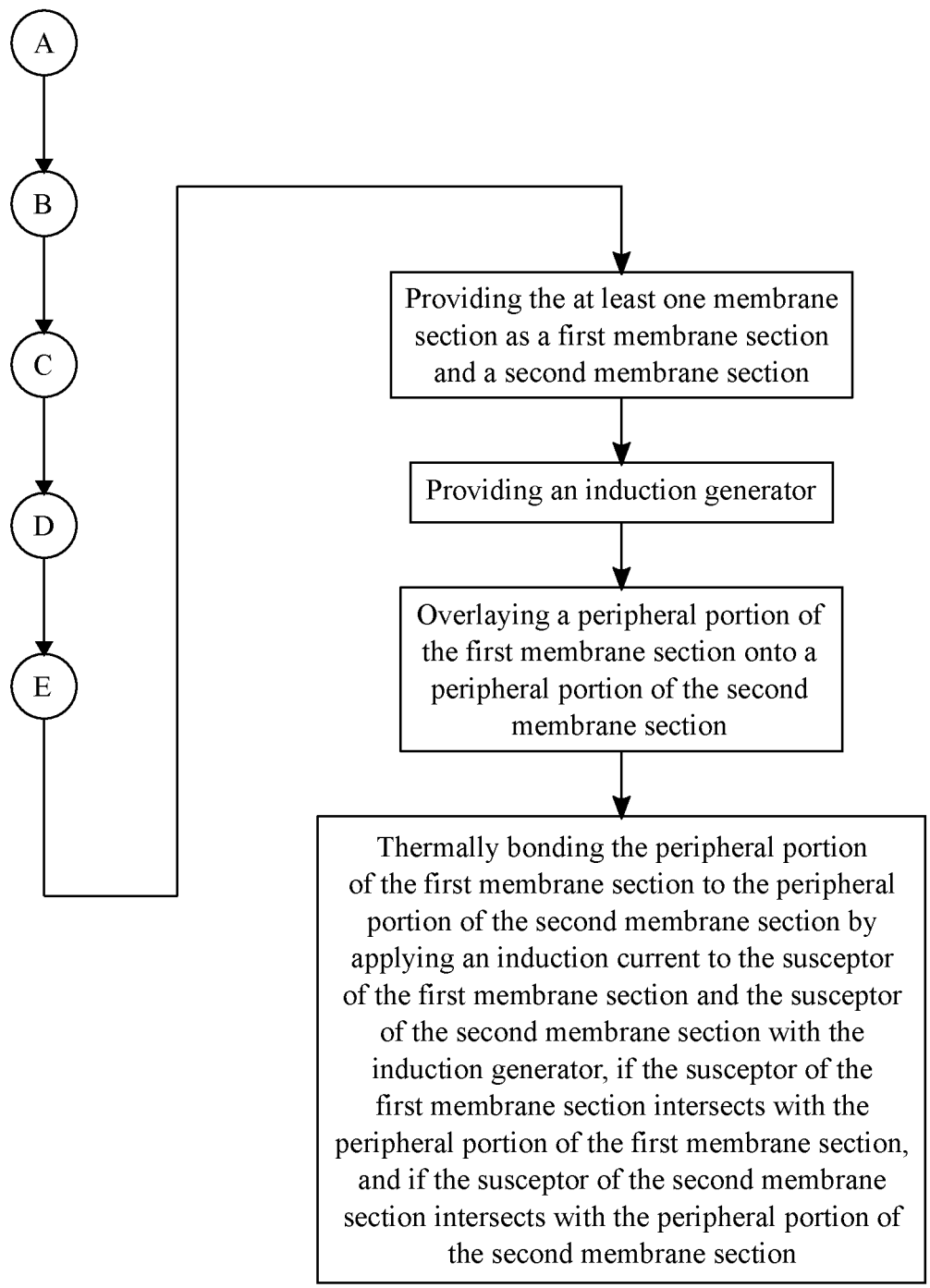
FIG. 11 is a flowchart illustrating a subprocess for bonding a first membrane section and a second membrane section via an inductive welding process, utilizing the susceptor as a welding element.

An additional seam-sealing process may utilize the susceptor 13 as an integral heating element to ensure full penetration of any weld, as outlined in FIG. 11. In this iteration, the at least one membrane section 17 is again a first membrane section and a second membrane section. An induction generator is provided, defined as any means of projecting electromagnetic waves into the susceptor 13. The peripheral portion of the first membrane section is again overlaid onto the peripheral portion of the second membrane section so that the peripheral portion of the first membrane section can be thermally bonded to the peripheral portion of the second membrane section by applying an induction current to the susceptor 13 of the first membrane section and the susceptor 13 of the second membrane section with the induction generator. A weldment is formed if the susceptor 13 of the first membrane section intersects with the peripheral portion of the first membrane section, and if the susceptor 13 of the second membrane section intersects with the peripheral portion of the second membrane section. This targeted weldment enables the precise formation of contiguous material bonds between disparate membrane sections, formed along peripheral portions of said membrane sections only if and where the susceptors of each respective membrane section 17 overlap. The inductive heating of the membrane section 17 via the integrated susceptor 13 is proposed to offer improved weld quality and reliability, enabling a more-complete coalescence of the constituent materials of each membrane section 17 due to the targeted application of heat. In a specific application relating to tiled carpeting (or other comparable flooring materials), the susceptor 13 may be utilized to activate a volume of thermoplastic adhesive by exposing a series of overlaid membrane sections to an inductive current simultaneously. This novel installation process would enable the post-installation adhesion of individual tiles of flooring material to be laid out across a subfloor prior to the controlled, in-place activation of thermoplastic adhesive via the susceptor 13. In summation, when compared to more conventional sealing methods the use of the susceptor 13 as a welding element offers greater positional accuracy and material integrity to any finished seam.

Figure 12:
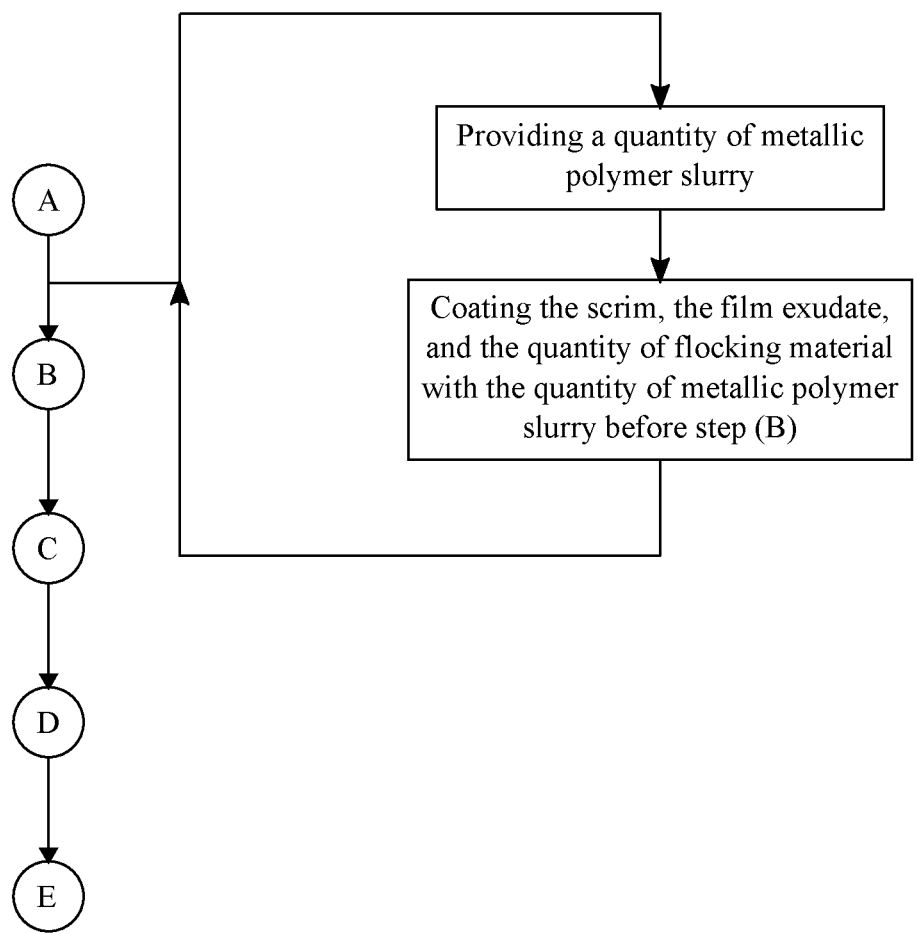
FIG. 12 is a flowchart illustrating a subprocess for coating the scrim, the film exudate, the quantity of flocking material with an antimicrobial metallic slurry prior to assembly.

It is further proposed that various surface treatments and sterilization processes are compatible with the membrane section 17 as described, specifically relating to the integrated susceptor 13 in various embodiments. It is broadly recognized that various metallic elements; including titanium, cobalt, nickel, copper, zinc, zirconium, molybdenum, tin, and lead; confer antimicrobial effects when dispersed across a surface. However, the regular treatment of a surface with potentially hazardous metals or metal oxides is inadvisable, despite any potential sanitary benefits. In this respect, the thermoplastic composition of the membrane section 17 enables the partial integration of such metallic elements as a surface treatment, wherein portions of each metallic particulate may embed into thermoplastic surfaces to impart antimicrobial effects onto the affected materials. Therefore, as outlined in FIG. 12, a quantity of metallic polymer slurry is provided so that the scrim 10, the film exudate 11, and the quantity of flocking material 14 is coated with the quantity of metallic polymer slurry before Step B. The composition of the metallic slurry is broadly contemplated to define an emulsion comprising any mixture of thermoplastic particles, metallic compounds, and carrier compounds as may be suitable for various application processes. In one embodiment, the film exudate 11 may be drawn through a bath of the metallic slurry prior to attachment to the scrim. In another embodiment, the scrim may be formed from a mixed thermoplastic batch that is infused with a set volume of metallic slurry prior to assembly into the apertured structure of the scrim. Further, the quantity of flocking material 14 may be mixed with dry particulate materials comprising the metallic slurry prior to introduction to the primary adhesive. In at least one iteration of the overall process, the susceptor 13 is utilized to subject the membrane section 17 to a uniform heating process via inductive heating, thereby solidifying the metallic slurry as a permanent surface element of the membrane section 17.

Figure 13:
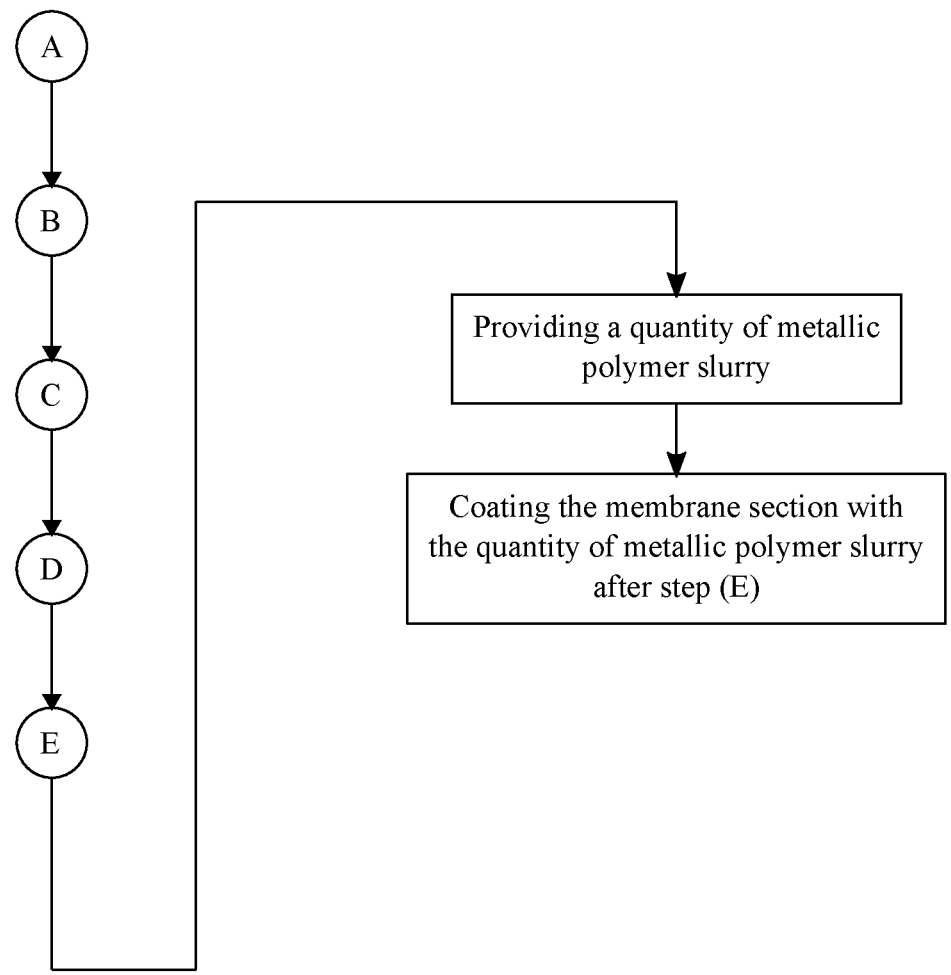
FIG. 13 is a flowchart illustrating a subprocess for coating the scrim, the membrane section with an antimicrobial metallic slurry post-assembly.

In reference to FIG. 13, the embedded susceptor 13 may also be used to apply various surface treatments post-manufacture and even post-installation in some applications. More specifically, a quantity of metallic polymer slurry is provided so that the membrane section 17 is coated with the quantity of metallic polymer slurry after Step E. In one exemplary use, the membrane section 17 may be employed as primary and secondary carpet backings installed in place of conventional carpet backings comprising fortified latex-based compounds. Notably, the susceptor 13 of the membrane section 17 could still be used to heat the membrane section 17 once installed beneath a carpet. Combined with a liquid vehicle, or other carrier compound, the metallic slurry may permeate the upper layers of a carpet to coat the membrane section 17 below. The susceptor 13 is then heated remotely via the induction generator, causing the metallic slurry to melt into the membrane section 17 and carpet structure. This process enables the effective sterilization of an installed carpet without necessitating the removal of the carpet, entirely. During this process, the metallic slurry also coats the fibrous elements of a conventional carpet, conferring the same antimicrobial benefits provided the same compounds embedded into the membrane section 17. This integration process may also be improved by thermoplastic adhesive dispersed into the metallic slurry, wherein the heat radiating from the susceptor 13 will melt and activate the thermoplastic adhesive to bond the metallic slurry to the membrane section 17. This surface treatment may be applied in a variety of other use-cases, including cushioned tiles and augmentation-membranes applied to existing carpet structures. Additional applications may be realized in construction barriers such as building wraps, vapor barriers, and roofing underlayment; subfloor protective membranes for tile floors; breathable fabrics for sportswear; blind or camouflage netting; insulating repair materials, tent liners, sleeping bag liners, or other insulating membranes; radon abatement barriers; and protective garments or other sterile clothing.

Although the invention has been explained in relation to its preferred embodiment, it is to be understood that many other possible modifications and variations can be made without departing from the spirit and scope of the invention as hereinafter claimed.

What is claimed is:

1. A method for manufacturing an impermeable membrane, the method comprising the steps of:
   (A) providing at least one scrim, a film exudate, a quantity of primary adhesive, at least one susceptor, a quantity of flocking material, wherein the scrim, the film exudate, and the quantity of flocking material are made of a thermoplastic material;
   (B) forming a primary laminate by extruding the film exudate onto the scrim;
   (C) applying the quantity of primary adhesive onto at least one specific face of the primary laminate;
   (D) depositing the quantity of flocking material onto the quantity of primary adhesive; and
   (E) forming at least one membrane section by mounting the susceptor into the primary laminate.

2. The method as claimed in claim 1 comprising the steps of:
   providing the at least one scrim as a first scrim and a second scrim; and
   sandwiching the film exudate in between the first scrim and the second scrim during step (B).

3. The method as claimed in claim 1 comprising the step of:
   projecting the quantity of flocking material onto the quantity of primary adhesive during step (D).

4. The method as claimed in claim 3 comprising the steps of:
   electrostatically grounding the primary laminate; and
   electrostatically charging the quantity of flocking material.

5. The method as claimed in claim 1 comprising the steps of:
   providing the susceptor as at least one conductive strand; and
   integrating the conductive strand along at least one selected edge of the primary laminate during step (E).

6. The method as claimed in claim 1 comprising the steps of:
   providing the susceptor as at least one conductive film; and
   integrating the conductive film across at least one of selected face of the primary laminate during step (E).

7. The method as claimed in claim 1 comprising the steps of:
   providing the at least one membrane section as a first membrane section and a second membrane section;
   overlaying a peripheral portion of the first membrane section onto a peripheral portion of the second membrane section; and
   ultrasonically bonding the peripheral portion of the first membrane section to the peripheral portion of the second membrane section.

8. The method as claimed in claim 1 comprising the steps of:
   providing the at least one membrane section as a first membrane section and a second membrane section;
   providing an impulse sealer;
   overlaying a peripheral portion of the first membrane section onto a peripheral portion of the second membrane section; and
   thermally bonding the peripheral portion of the first membrane section to the peripheral portion of the second membrane section with the impulse sealer.

9. The method as claimed in claim 1 comprising the steps of:
   providing the at least one membrane section as a first membrane section and a second membrane section;
   providing an induction generator;
   overlaying a peripheral portion of the first membrane section onto a peripheral portion of the second membrane section; and
   thermally bonding the peripheral portion of the first membrane section to the peripheral portion of the second membrane section by applying an induction current to the susceptor of the first membrane section and the susceptor of the second membrane section with the induction generator, if the susceptor of the first membrane section intersects with the peripheral portion of the first membrane section, and if the susceptor of the second membrane section intersects with the peripheral portion of the second membrane section.

10. The method as claimed in claim 1 comprising the steps of:
    providing a quantity of metallic polymer slurry; and
    coating the scrim, the film exudate, and the quantity of flocking material with the quantity of metallic polymer slurry before step (B).

11. The method as claimed in claim 1 comprising the steps of:
    providing a quantity of metallic polymer slurry; and
    coating the membrane section with the quantity of metallic polymer slurry after step (E).

12. A method for manufacturing an impermeable membrane, the method comprising the steps of:
    (A) providing at least one scrim, a film exudate, a quantity of primary adhesive, at least one susceptor, a quantity of flocking material, wherein the scrim, the film exudate, and the quantity of flocking material are made of a thermoplastic material;
    (B) forming a primary laminate by extruding the film exudate onto the scrim;
    (C) applying the quantity of primary adhesive onto at least one specific face of the primary laminate; and
    (D) depositing the quantity of flocking material onto the quantity of primary adhesive.

13. The method as claimed in claim 12 comprising the steps of:
    providing the at least one scrim as a first scrim and a second scrim; and sandwiching the film exudate in between the first scrim and the second scrim during step (B).

14. The method as claimed in claim 12 comprising the step of:
projecting the quantity of flocking material onto the quantity of primary adhesive during step (D).

15. The method as claimed in claim 14 comprising the steps of:
electrostatically grounding the primary laminate; and
electrostatically charging the quantity of flocking material.

16. The method as claimed in claim 12 comprising the steps of:
forming at least one membrane section by mounting the susceptor into the primary laminate after step (D);
integrating at least one conductive strand along at least one selected edge of the primary laminate, if the susceptor is the at least one conductive strand; and
integrating at least one conductive film across at least one of selected face of the primary laminate, if the susceptor is the at least one conductive film.

17. The method as claimed in claim 12 comprising the steps of:
providing the at least one membrane section as a first membrane section and a second membrane section;
overlaying a peripheral portion of the first membrane section onto a peripheral portion of the second membrane section; and
ultrasonically bonding the peripheral portion of the first membrane section to the peripheral portion of the second membrane section.

18. The method as claimed in claim 12 comprising the steps of:
providing the at least one membrane section as a first membrane section and a second membrane section;
providing an impulse sealer;
overlaying a peripheral portion of the first membrane section onto a peripheral portion of the second membrane section; and
thermally bonding the peripheral portion of the first membrane section to the peripheral portion of the second membrane section with the impulse sealer.

19. The method as claimed in claim 12 comprising the steps of:
forming at least one membrane section by mounting the susceptor into the primary laminate after step (D);
providing the at least one membrane section as a first membrane section and a second membrane section;
providing an induction generator;
overlaying a peripheral portion of the first membrane section onto a peripheral portion of the second membrane section; and
thermally bonding the peripheral portion of the first membrane section to the peripheral portion of the second membrane section by applying an induction current to the susceptor of the first membrane section and the susceptor of the second membrane section with the induction generator, if the susceptor of the first membrane section intersects with the peripheral portion of the first membrane section, and if the susceptor of the second membrane section intersects with the peripheral portion of the second membrane section.

20. The method as claimed in claim 12 comprising the steps of:
providing a quantity of metallic polymer slurry; and
coating the scrim, the film exudate, and the quantity of flocking material with the quantity of metallic polymer slurry before step (B), or coating the membrane section with the quantity of metallic polymer slurry after step (D).

* * * * *